US012626265B2

(12) United States Patent
Wiig et al.

(10) Patent No.: US 12,626,265 B2

(45) Date of Patent: *May 12, 2026

(54) SYSTEMS AND METHODS FOR ENHANCING REGULATORY COMPLIANCE THROUGH DIGITIZATION

(71) Applicant: Wells Fargo Bank, N.A., San Francisco, CA (US)

(72) Inventors: Jennifer L. Wiig, Des Moines, IA (US); Richard Wells, Des Moines, IA (US); Pamela Rehg, O'Fallon, IL (US); Janette K. Henry, Charlotte, NC (US); Danya Duddleston, San Anselmo, CA (US); Sarah Spindler, Minneapolis, MN (US); Michael Chauvin, Des Moines, IA (US); Mark Iverson, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/882,298

(22) Filed: Sep. 11, 2024

(65) Prior Publication Data

US 2025/0005600 A1      Jan. 2, 2025

Related U.S. Application Data

(63) Continuation of application No. 17/321,985, filed on May 17, 2021, now Pat. No. 12,125,048.

(Continued)

(51) Int. Cl.
| | |
|---|---|
| *G06Q 30/018* | (2023.01) |
| *G06Q 30/0214* | (2023.01) |
| *G06Q 50/18* | (2012.01) |

(52) U.S. Cl.
CPC ....... *G06Q 30/018* (2013.01); *G06Q 30/0214* (2013.01); *G06Q 50/18* (2013.01)

(58) Field of Classification Search
None
See application file for complete search history.

(56) References Cited

U.S. PATENT DOCUMENTS

| | | |
|---|---|---|
| 6,985,886 B1 | 1/2006 | Broadbent |
| 7,395,231 B2 | 7/2008 | Steury |

(Continued)

FOREIGN PATENT DOCUMENTS

WO      2005024676 A1      3/2005

OTHER PUBLICATIONS

12 CFR 1024.15 (from FDIC Consumer Compliance Manual of 2018) (2018).

(Continued)

*Primary Examiner* — Dennis W Ruhl

(74) *Attorney, Agent, or Firm* — K&L Gates LLP

(57) ABSTRACT

Systems, apparatuses, methods, and computer program products are disclosed for enhancing regulatory compliance through digitization. An example method includes automatically generating a digital affiliated business arrangement disclosure statement (ABAD) for a client, and causing presentation of the digital ABAD by a graphical user interface (GUI) of a client device associated with the client. The example method further includes causing referral of the client to an affiliate. The example method further includes generating a digital ABAD record and storing the digital ABAD record.

20 Claims, 8 Drawing Sheets

Related U.S. Application Data

(60) Provisional application No. 63/153,267, filed on Feb. 24, 2021.

(56) References Cited

U.S. PATENT DOCUMENTS

| | | | |
|---|---|---|---|
| 7,672,881 | B2 | 3/2010 | Steury |
| 7,716,105 | B1 | 5/2010 | Tiedeman |
| 8,195,538 | B2 | 6/2012 | Steury |
| 8,423,469 | B2 | 4/2013 | Marlow |
| 8,433,650 | B1 | 4/2013 | Thomas |
| RE47,762 | E | 12/2019 | Thomas |
| 10,810,692 | B1 | 10/2020 | Thomas |
| 12,125,048 | B1 * | 10/2024 | Wiig ..................... G06Q 50/18 |
| 2001/0037287 | A1 | 11/2001 | Broadbent |
| 2002/0144154 | A1 | 10/2002 | Tomkow |
| 2004/0064402 | A1 | 4/2004 | Dreyer |
| 2004/0167850 | A1 | 8/2004 | Dreyer |
| 2006/0047591 | A1 | 3/2006 | Snouffer |
| 2007/0233790 | A1 | 10/2007 | Agarwal |
| 2007/0276708 | A1 | 11/2007 | Steury |
| 2008/0027845 | A1 | 1/2008 | Dreyer |
| 2010/0241556 | A1 | 9/2010 | Reinheimer |
| 2012/0221364 | A1 | 8/2012 | Steury |
| 2019/0088149 | A1 | 3/2019 | Fink |

OTHER PUBLICATIONS

"RESPA Exception: Affiliated Business Arrangements (ABAs)" (2005).

* cited by examiner

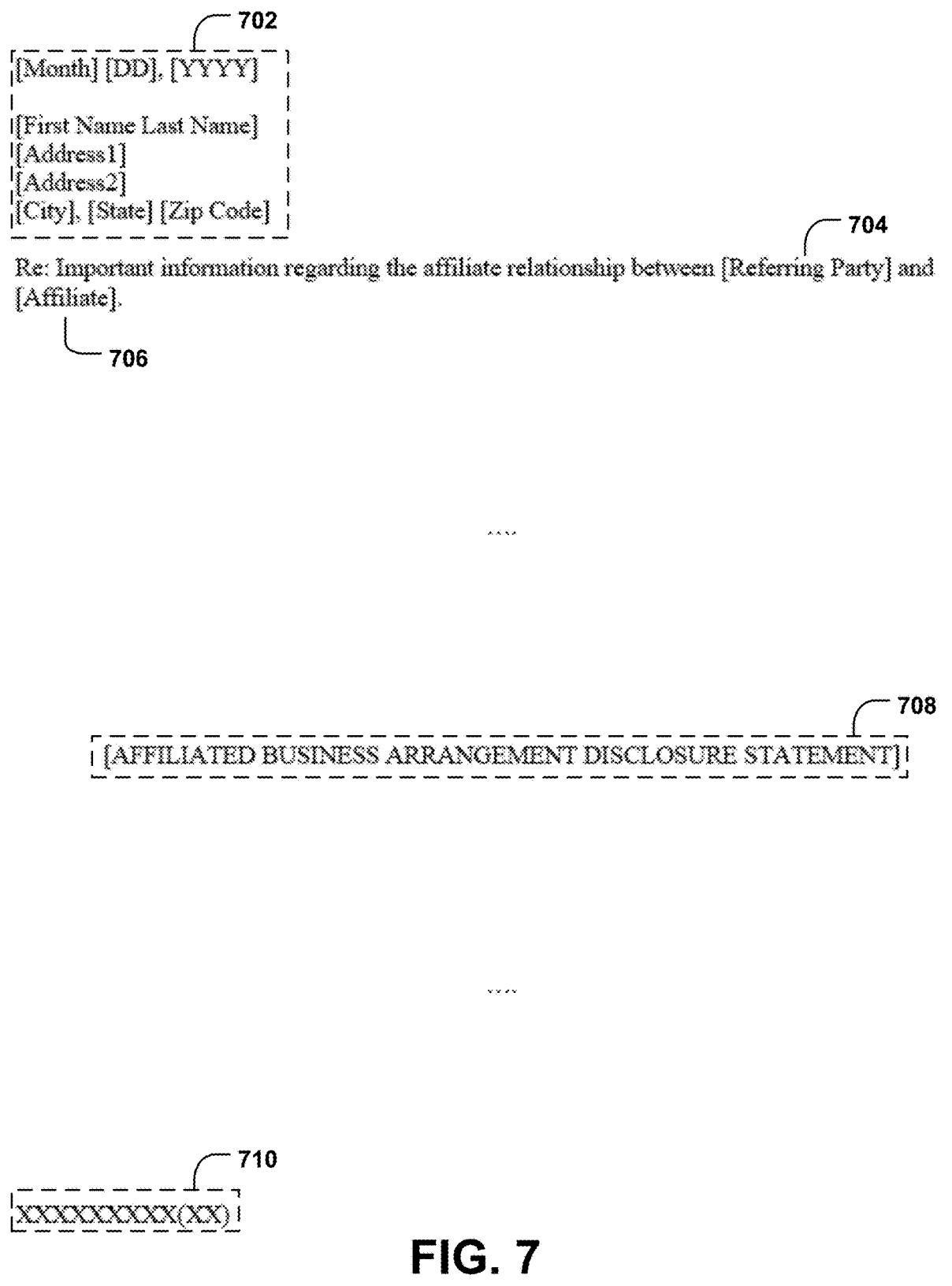

702

[Month] [DD], [YYYY]

[First Name Last Name]
[Address1]
[Address2]
[City], [State] [Zip Code]

704

Re: Important information regarding the affiliate relationship between [Referring Party] and [Affiliate].

706

. . . .

708

[AFFILIATED BUSINESS ARRANGEMENT DISCLOSURE STATEMENT]

. . . .

710

XXXXXXXX(XX)

FIG. 7

SYSTEMS AND METHODS FOR ENHANCING REGULATORY COMPLIANCE THROUGH DIGITIZATION

CROSS-REFERENCE TO RELATED APPLICATIONS

This application is a continuation of U.S. patent application Ser. No. 17/321,985, filed May 17, 2021, which claims the benefit of U.S. Provisional Patent Application No. 63/153,267, filed Feb. 24, 2021, each of which are incorporated by reference herein in their entireties.

TECHNOLOGICAL FIELD

Example embodiments of the present disclosure relate generally to digitization and, more particularly, to systems and methods for enhancing regulatory compliance through digitization.

BACKGROUND

The Real Estate Settlement Procedures Act of 1974 (RESPA) is designed to protect homeowners by assisting them in becoming better educated while shopping for real estate services. To this end, when a referring party in an affiliated business arrangement is making a referral for real estate settlement services to one of its affiliates, RESPA requires delivery of an affiliated business arrangement disclosure statement (ABAD) to the party being referred. The ABAD is a document setting forth the nature of the business relationship between the referring entity and its affiliate and contains information required by Regulation X under RESPA.

BRIEF SUMMARY

As technology advances and more and more business occurs digitally, legacy regulatory obligations can often present unexpected burdens or barriers to firms wishing to offer products and services to their clients. The requirement to provide clients with an ABAD is one such example. Consider that a securities licensed financial advisor (FA) is uniquely well-placed to recommend products and services to clients that may enhance their financial circumstances. Many such products and services may involve real estate settlement services, and may be subject to the requirements of RESPA. Where the FA wishes to refer a client to a trusted affiliate for real estate settlement services, RESPA requires delivery to the client of an ABAD apprising the client of the nature of the relationship between the FA's organization and the affiliate. Historically, interactions between FAs and clients would occur face-to-face, making delivery of an ABAD a relatively straightforward exercise. However, interactions between FAs and clients have become increasingly reliant upon telephone or digital engagement, and this trend has significantly accelerated in response to the emergence of the COVID-19 pandemic in early 2020. When engaging digitally or over the phone, delivery of an ABAD to a client is not as straightforward as when done in person. Another confounding factor is that many brokerages and advisory firms are finding that more and more of their clients are utilizing robo-advisors or are independently managing their own portfolios using the increasingly sophisticated trading software that is proliferating throughout the wealth management industry. For such clients who do not have a dedicated FA, there is no individual who is well-positioned to manually ensure delivery of an ABAD, resulting in a situation in which the brokerage or financial advisory firm cannot easily comply with regulatory requirements regarding delivery of an ABAD using traditional manual methods. As a result, a brokerage or financial advisory firm in this position may simply decide not to make referrals to affiliates to such clients. Accordingly, a need exists for new tools for delivery of an ABAD to a client, both to ease the increasingly complex burden on FAs caused by delivery of ABADs to remote clients, and to enable delivery of an ABAD to those clients who do not have an assigned FA in the first instance.

Systems, apparatuses, methods, and computer program products are disclosed herein for solving such problems, and using digitization of the ABAD delivery process to enhance regulatory compliance.

In one example embodiment, a method is provided for enhancing regulatory compliance through digitization. The method includes automatically generating, by digitization circuitry, a digital affiliated business arrangement disclosure statement (ABAD) for a client, and causing, by communications circuitry, presentation of the digital ABAD by a graphical user interface (GUI) of a client device associated with the client. The method further includes causing, by the communications circuitry, referral of the client to an affiliate, generating, by the digitization circuitry, a digital ABAD record; and storing the digital ABAD record.

In another example embodiment, an apparatus is provided for enhancing regulatory compliance through digitization. The apparatus includes digitization circuitry configured to automatically generate a digital affiliated business arrangement disclosure statement (ABAD) for a client, and generate a digital ABAD record. The apparatus also includes communications circuitry configured to cause presentation of the digital ABAD by a graphical user interface (GUI) of a client device associated with the client, and cause referral of the client to an affiliate. Furthermore, the apparatus includes a memory configured to store the digital ABAD record.

In another example embodiment, a computer program product is provided for enhancing regulatory compliance through digitization. The computer program product includes at least one non-transitory computer-readable storage medium storing software instructions that, when executed, cause an apparatus to automatically generate a digital affiliated business arrangement disclosure statement (ABAD) for a client, and cause presentation of the digital ABAD by a graphical user interface (GUI) of a client device associated with the client. The software instructions, when executed, further cause the apparatus to cause referral of the client to an affiliate, generate a digital ABAD record, and store the digital ABAD record.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

3

Figure 1:
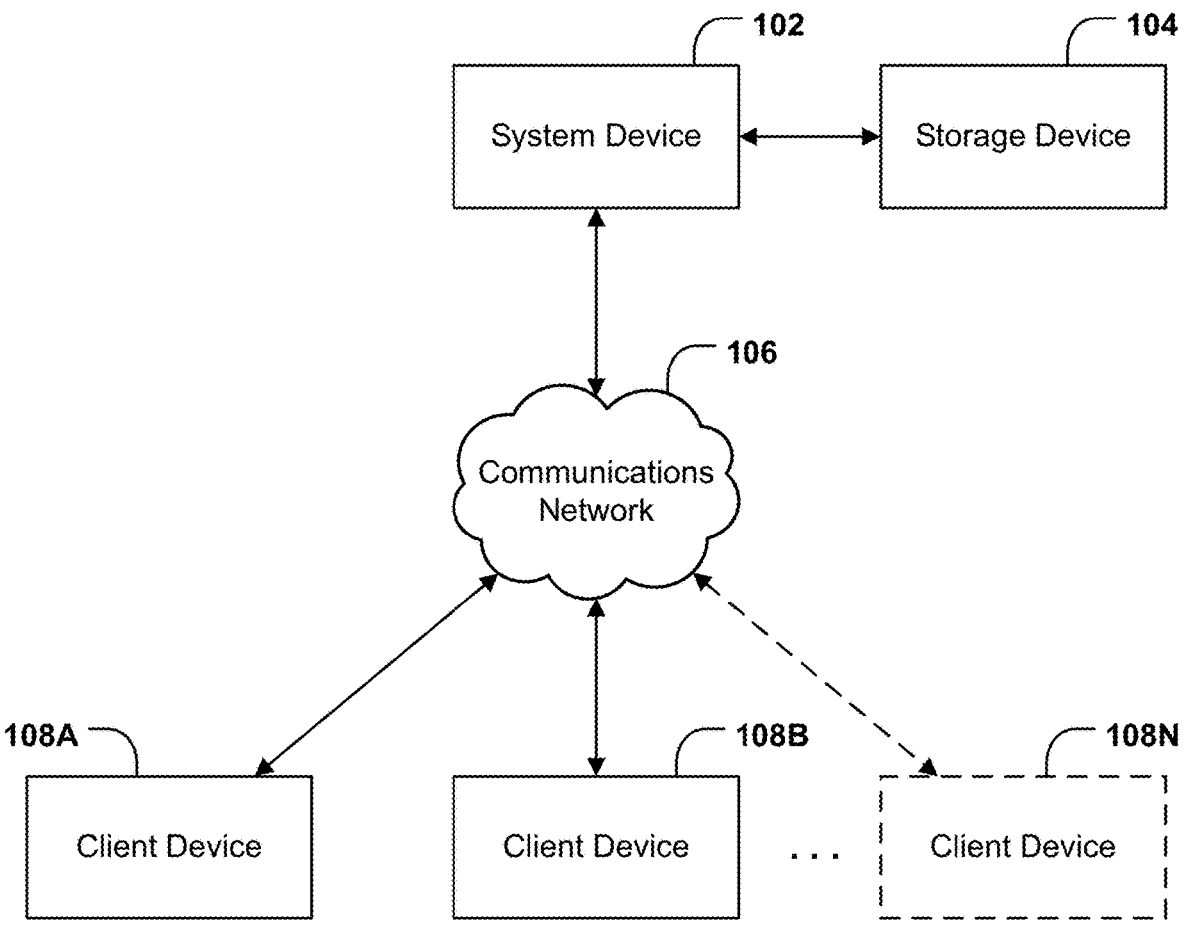

FIG. 1 illustrates a system in which some example embodiments may be used.

Figure 2:
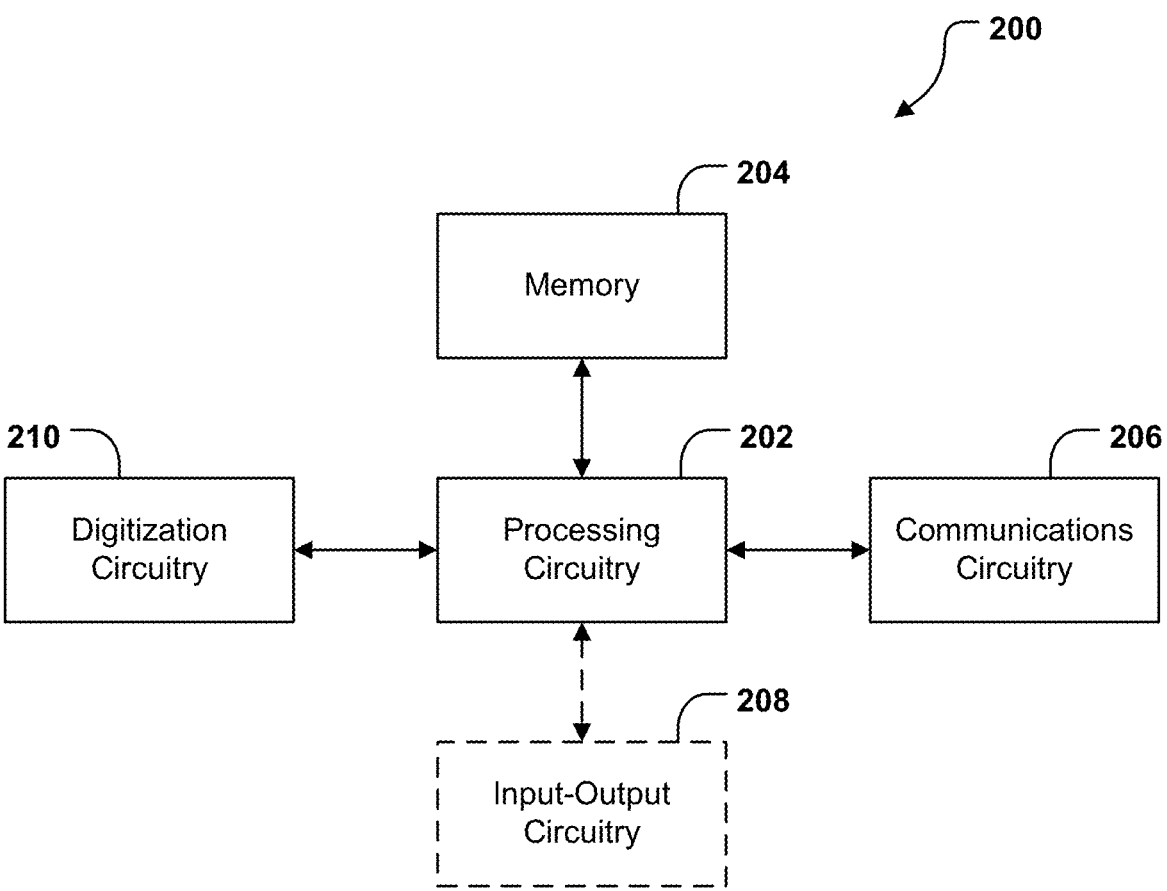

FIG. 2 illustrates a schematic block diagram of example circuitry embodying a device that may perform various operations in accordance with some example embodiments described herein.

Figure 3:
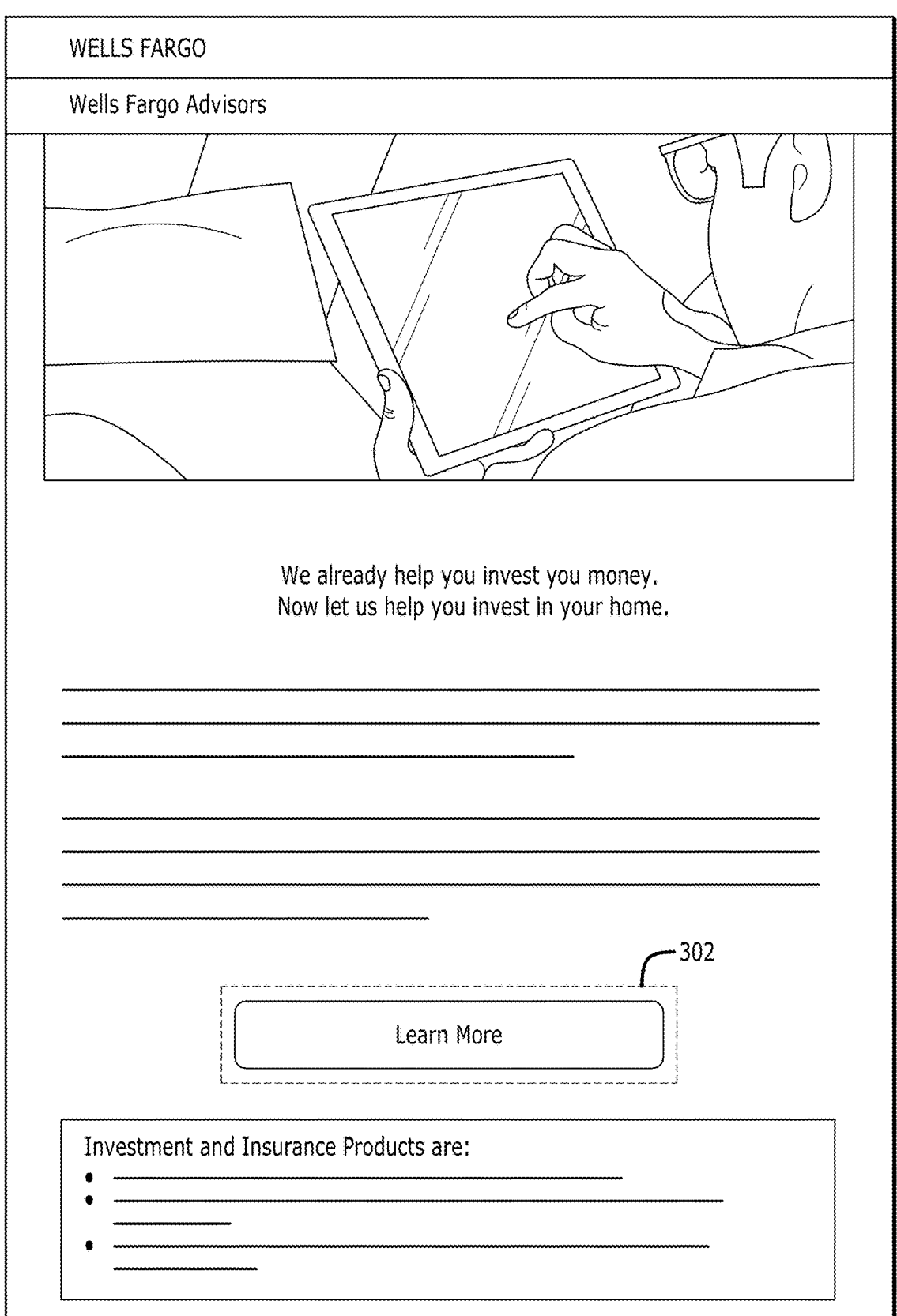

FIG. 3 illustrates an example message used in some example embodiments described herein.

Figure 4:
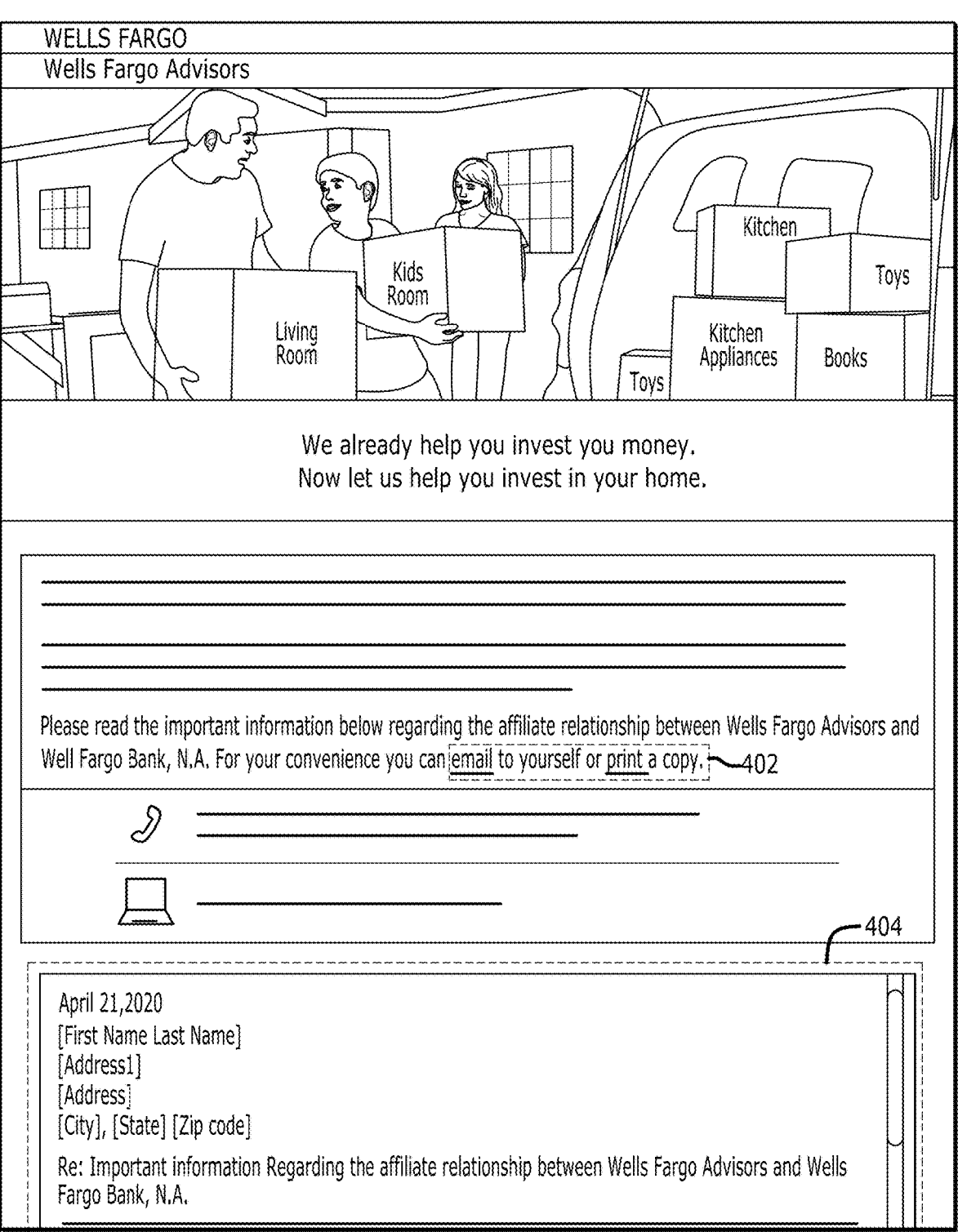

FIG. 4 illustrates an example landing page for delivery of a digital ABAD, as may be used in some example embodiments described herein.

Figure 5:
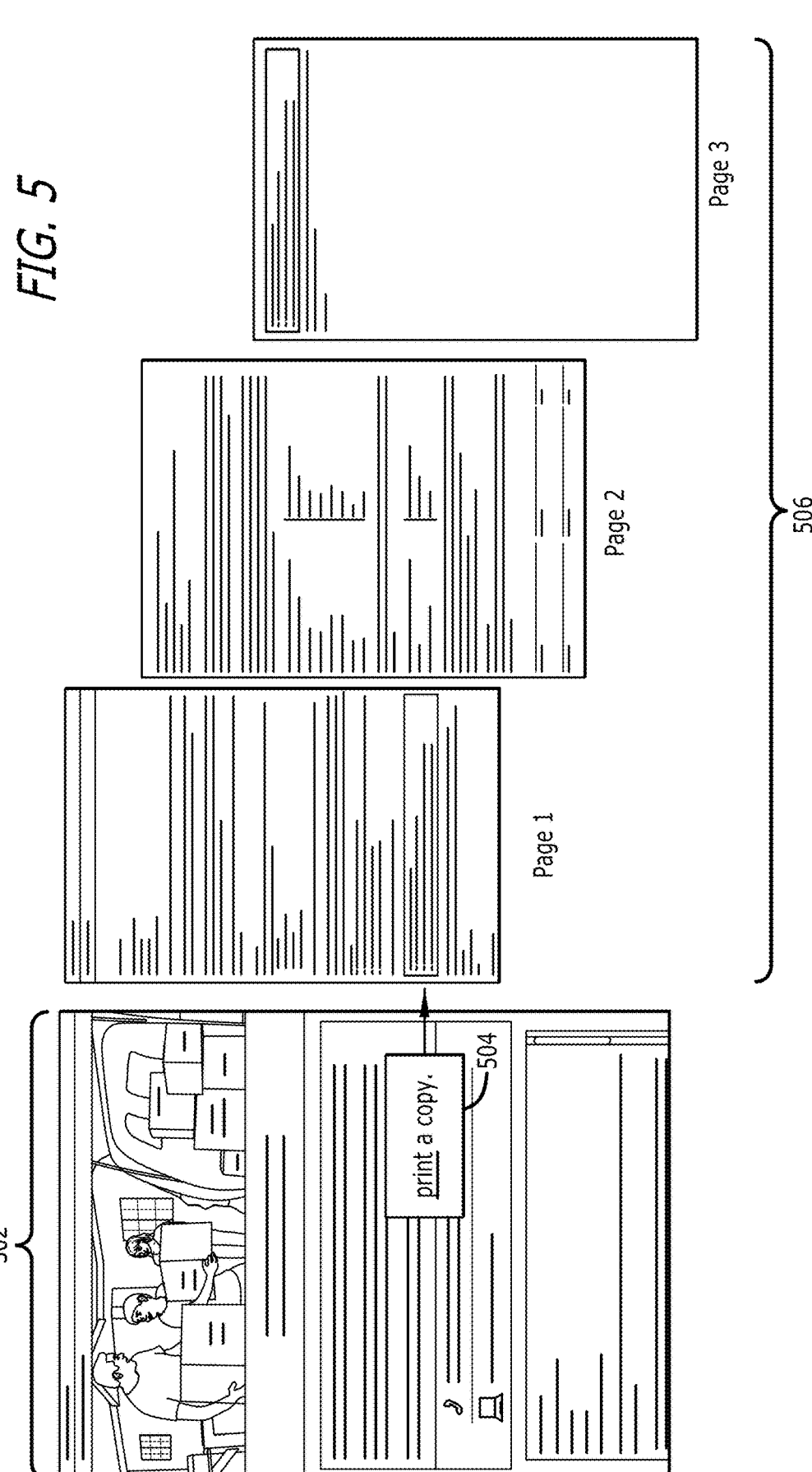

FIG. 5 illustrates an example client engagement flow, in accordance with some example embodiments described herein.

Figure 6:
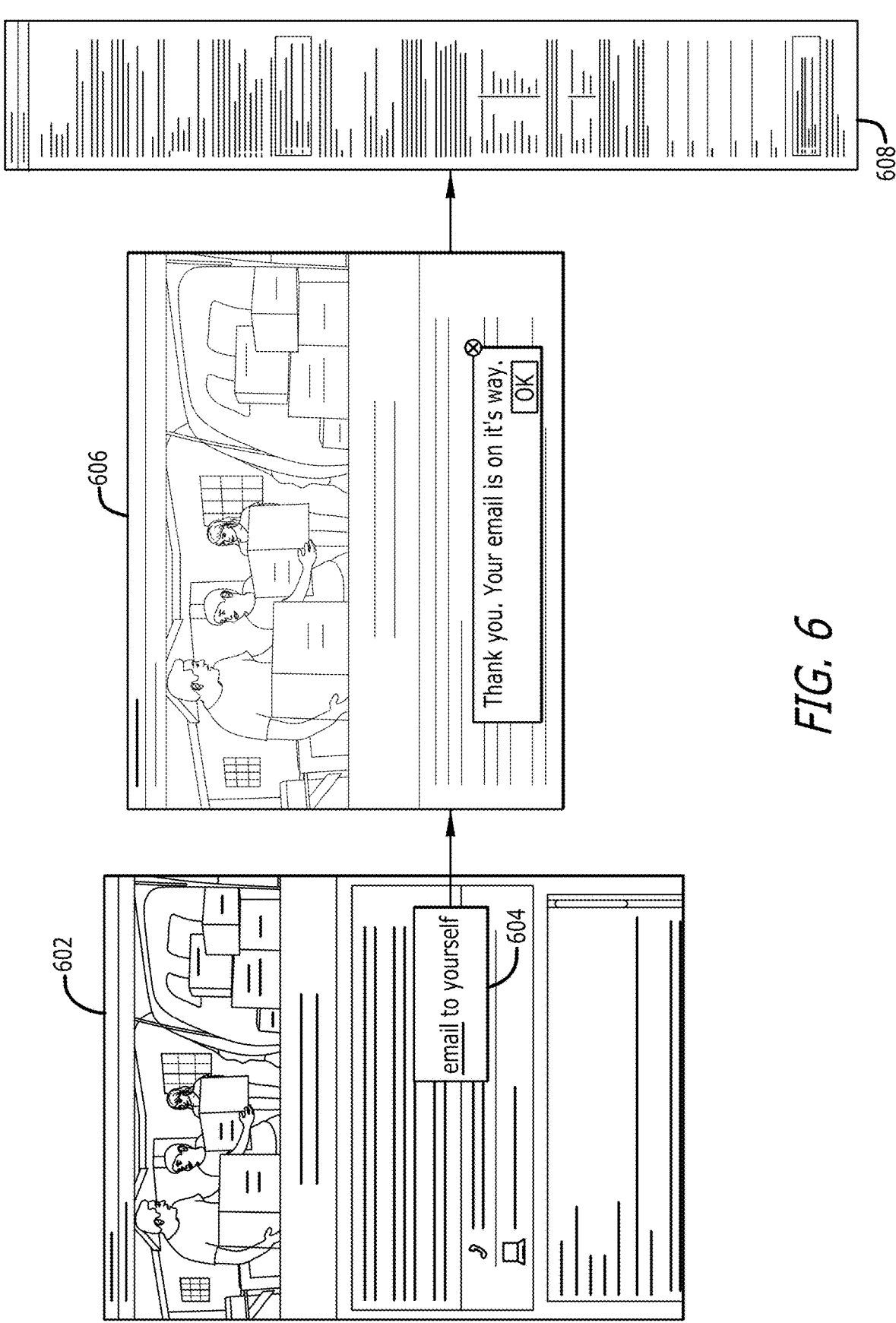

FIG. 6 illustrates another example client engagement flow, in accordance with some example embodiments described herein.

FIG. 7 illustrates the various elements of a digital ABAD at a high level.

Figure 8:
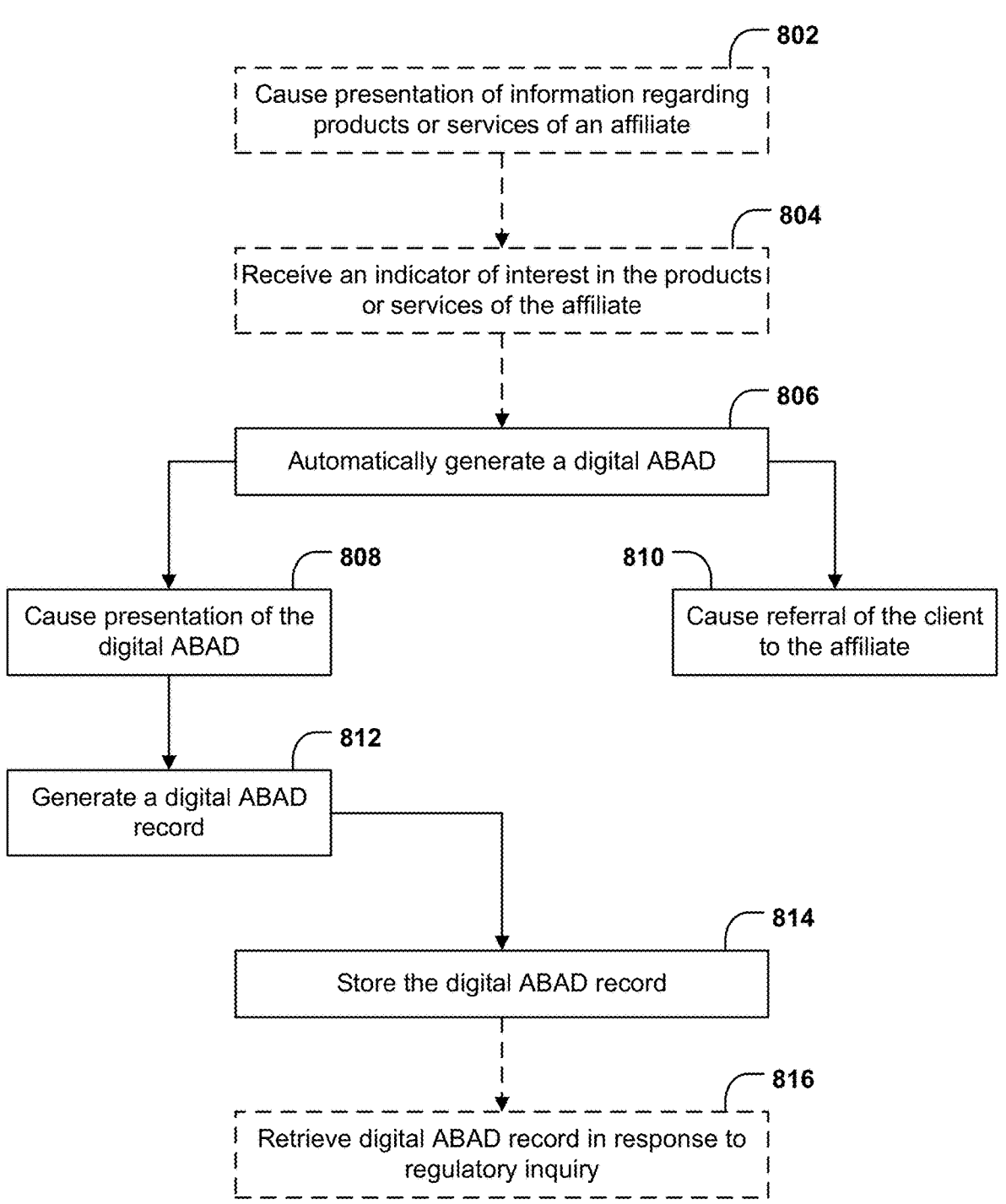

FIG. 8 illustrates an example flowchart for enhancing regulatory compliance through digitization, in accordance with some example embodiments described herein.

DETAILED DESCRIPTION

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Computing devices such as smartphones, laptop computers, tablet computers, and wearable devices are generally collectively referred to as mobile devices.

The term "server" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, methods, apparatuses, systems, and computer program products are described herein that provide for enhancing regulatory compliance through digitization. Traditionally, an FA has been able to deliver an ABAD to a client by placing a physical document in front of the client and requesting the client's signature on the document. However, as more and more FAs are forced to interact with their clients remotely or digitally, and as more and more brokerage clients utilize self-service financial advisory tools such as robo-advisors and trading platforms, delivery of an ABAD to a client to permit a referral to an affiliate is becoming increasingly complex. A need exists for an improved mechanism for delivery of an ABAD that ensures regulatory compliance while easing the burden on FAs and brokerages, and still enabling the delivery of useful affiliate referrals to clients.

Systems, apparatuses, methods, and computer program products are disclosed herein that resolve such needs. In contrast to these conventional techniques for ABAD delivery, the present disclosure describes tools enabling the creation and utilization of a "digital ABAD" to satisfy RESPA disclosure requirements in connection with a referral of a client from a referring entity to one of its affiliates. As described in greater detail below, a digital ABAD may be generated and digitally transmitted to a client, thus permitting a brokerage to immediately refer a client to an affiliate as part of a self-service interaction between the client and the brokerage, while at the same time provably fulfilling the brokerage's obligation to provide disclosure to the client of its affiliate relationship. Moreover, digitization of the ABAD delivery process relieves FAs of a paperwork burden, and avoids the possibility that an FA may fail to satisfy his or her disclosure obligation when making a referral.

As set forth below, the present disclosure provides a technical solution that replaces a cumbersome manual process for regulatory compliance with a robust digital experience that both enhances the ability to ensure regulatory compliance and unlocks new methods of interacting with existing clients. There are many advantages of these and other embodiments described herein. For instance, the digital solution set forth below enhances the ability of entities to ensure compliance with existing laws and regulation. In addition, providing automated and digital tools to replace the historical manual reporting obligations, the solutions set forth herein relief FAs of potential liability while minimizing the time required by FAs for ministerial matters. Still further, by utilizing digital solutions as set forth below, referring entities are able to make referrals to clients in near-real-time, which historically has not been possible in situation where delivery of an ABAD has been required. Finally, by storing records of the various digital ABADs associated with its various referrals, example embodiments permit the referring entity to audit its compliance with the ABAD requirements of RESPA, and to demonstrate this compliance to internal or external auditors or regulatory bodies.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which embodiments of the present disclosure may operate. As illustrated, a system device 102 is shown that may perform various operations for enhancing regulatory compliance through digitization, in accordance with the embodiments set forth herein. The system device 102 is connected to a storage device 104. Although system device 102 and storage device 104 are described in singular form, some embodiments may utilize more than one system device 102 or one or more storage device 104. Whatever the implementation, the system device 102 and any constituent components (as described below in connection with FIG. 2) may receive and/or transmit information via communications network 106 (e.g., the Internet) with any number of client devices, shown in FIG. 1 as client device 108A, client device 108B, through client device 108N.

System device 102 may be implemented as one or more servers. System device 102 may be entirely located at a single facility such that all components of system device 102 are physically proximate to each other. However, in some embodiments, some components of system device 102 may not be physically proximate to the other components of system device 102, and instead may be connected via communications network 106. Particular components of system device 102 are described in greater detail below with reference to apparatus 200 in connection with FIG. 2.

System device 102 may alternatively be implemented as a device with which clients of a referring entity may interact. In such embodiments, the system device 102 may comprise a device owned and/or operated by clients of the referring entity, upon which an application or mobile app is installed to permit direct engagement between the referring entity and the client.

Storage device 104 may comprise a distinct component from system device 102, or it may comprise an element of system device 102 (e.g., memory 204, as described below in connection with FIG. 2). Storage device 104 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 106). Storage device 104 may host the software executed to operate the system device 102. In addition, or in the alternative, storage device 104 may store information relied upon during operation of the system device 102, such as information regarding affiliates of an entity that operates or engages with system device 102, regulatory requirements governing affiliate relationships for the entity operating the system device 102, digital ABAD records to be generated, revised, analyzed, and/or retrieved using the system device 102, or the like. In addition, storage device 104 may store control signals, device characteristics, and access credentials enabling interaction between the system device 102 and one or more of client device 108A through client device 108N.

Client device 108A, client device 108B, through client device 108N may be embodied by any computing devices known in the art, such as desktop or laptop computers, tablet devices, smartphones, or the like. These devices may be independent devices, or may in some embodiments be peripheral devices communicatively coupled to other computing devices. Although FIG. 1 illustrates an environment and implementation of the present disclosure in which the system device 102 interacts with one or more of client device 108A through client device 108N, in some embodiments clients may directly interact with the system device 102 (e.g., via input/output circuitry of system device 102), in which case a separate client device need not be utilized. Whether by way of direct interaction or via a separate client device, a client may communicate or otherwise interact with the system device 102 to perform functions described herein and/or achieve benefits as set forth in this disclosure.

Example Implementing Apparatuses

System device 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, and digitization circuitry 210, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3-8.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 104, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via communications circuitry 206 from a separate device such as one of client device 108A through client device 108N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises digitization circuitry 210 configured to generate, revise, analyze, retrieve, or otherwise utilize a digital affiliated business arrangement disclosure statement (ABAD). The digitization circuitry 210 may utilize processor 202, memory 204, or any other hardware component included in the apparatus 200 to perform these operations, as described in connection with FIG. 8 below. The digitization circuitry 210 may further utilize communications circuitry 206 to gather data from a variety of sources (e.g., client device 108A through client device 108N or storage device 104, as shown in FIG. 1), and may utilize input-output circuitry 208 to exchange information directly with a user.

Although components 202-210 are described in part using functional language, it will be understood that the particular implementations necessarily include the use of particular hardware. It should also be understood that certain of these components 202-210 may include similar or common hardware. For example, the digitization circuitry 210 may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the digitization circuitry 210 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the digitization circuitry 210 is implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments of the present disclosure are described below in connection with a series of graphical user interfaces and a flowchart.

Delivery of a Digital ABAD

Turning to FIGS. 3-7, a series of GUIs are provided that illustrate example embodiments described herein. As noted previously, a user may interact with the system device 102 by directly engaging with input-output circuitry 208 of an apparatus 200 comprising the system device 102. In such an embodiment, the GUIs shown in FIGS. 3-7 may be displayed to a user by the apparatus 200. Alternatively, a user may interact with the system device 102 using a separate client device (e.g., any of client device 108A through client device 108N, as shown in FIG. 1), which may communicate with the system device 102 via communications network 106. In such an embodiment, the GUIs shown in FIGS. 3-7 may be displayed to the client by the client device as directed by the system device 102.

Turning first to FIG. 3, an example message is shown from a brokerage to its clients about services of the brokerage's affiliated retail mortgage lender. The message may be presented to a client by whatever device the client is using to interact with the brokerage, and may be delivered as an email or through another advertising channel as may be appropriate. As shown in the example provided in FIG. 3, the email message may include a call-to-action element 302 inviting the client to "learn more" about the offerings of the brokerage's affiliate. Following selection of the call-to-action, the client may be taken to a browser window that displays a landing page of the type shown in FIG. 4, which enables the affiliate referral process to begin. The landing page may offer the client multiple options for how to view the digital ABAD. For instance, element 402 illustrates that the landing page can provide hyperlinks enabling the client to receive a copy of the digital ABAD as an email or to print a copy of the digital ABAD. Furthermore, the digital ABAD may itself be presented embedded within the landing page so the client can view the digital ABAD immediately, as shown at element 404 of FIG. 4 (which crops out the bottom portion of the digital ABAD for ease of illustration).

FIG. 5 illustrates the interaction that may occur if a client selects a hyperlink from the landing page to print a copy of the digital ABAD. As can be seen, element 502 illustrates the landing page of FIG. 4, and when the client elects to "print a copy" as shown by element 504, then a series of pages comprising the digital ABAD may be generated and shown to the client via the GUI of the client's device, as shown in element 506.

FIG. 6 illustrates the interaction that may occur if a client selects a hyperlink from the landing page to receive an emailed copy of the digital ABAD. As can be seen, element 602 illustrates the landing page of FIG. 4, and when the client elects to "email to yourself" as shown by element 604, then a confirmatory view is shown to the user in element 606, and an email is generated and transmitted to the client. The email may contain the digital ABAD in its body, as shown by element 608.

Turning next to FIG. 7, an example illustration is provided showing the various elements of a digital ABAD at a high level. Element 702 illustrates that the digital ABAD must be personalized, and as such will include a date on which it is being generated and transmitted, and the name and address of the client receiving the digital ABAD. Elements 704 and 706 illustrate that the digital ABAD will identify both the referring party and the affiliate to which the client is being referred. Element 708 indicates that the digital ABAD will include a set of affiliated business arrangement disclosures required by RESPA. Because the specific requirements of RESPA may depend on the nature of the affiliate referral in question and may evolve over time as regulations evolve, the specifics of these requirements are omitted from FIG. 7 itself. Finally, element 710 illustrates a unique identifier included in the digital ABAD that enables the referring party to connect a particular referral with the digital ABAD created for that particular referral.

Having described a series of graphical elements with which example embodiments generate and use to engage with a client, an example set of operations are provided below in connection with the flowchart shown in FIG. 8.

Example Operations

Turning to FIG. 8, an example flowchart is illustrated that sets forth operations implemented by example embodiments described herein to enhance regulatory compliance through digitization. The operations illustrated in FIG. 8 may, for example, be performed by the system device 102 shown in FIG. 1, which may operate on behalf of a referring entity that wishes to refer a client to one of its affiliates while abiding by the regulatory requirements governing affiliate referrals (e.g., the obligation under RESPA to provide an affiliated business arrangement disclosure statement to clients prior to making affiliate referrals of certain kinds). The system device 102 performing the operations described below may be embodied by an apparatus 200, which is shown and described in connection with FIG. 2. To perform the various operations illustrated in FIG. 8, the apparatus 200 may utilize one or more of processor 202, memory 204, communications circuitry 206, input-output circuitry 208, digitization circuitry 210, and/or any combination thereof. It will be understood that the system device 102 may interact directly with a client via input-output circuitry 208, or may interact with a client via a separate client device that may have similar or equivalent physical componentry facilitating such user interaction (e.g., client device 108A through client device 108N, as shown in FIG. 1).

The procedure illustrated in FIG. 8 may begin at operation 802 or at operation 806. A referring entity may begin the procedure at operation 802 if, for instance, the referring entity wishes to determine whether a client has an interest in the products or services of an affiliate prior to initiating a referral to that affiliate. The referring entity may however begin the procedure at operation 806, in cases such as when the referring entity, or a representative thereof, has already decided to refer the client to an affiliate. For ease of description, the operations are described herein starting from operation 802.

As shown by operation 802, the apparatus 200 may optionally include means, such as communications circuitry 206, input-output circuitry 208, or the like, for causing presentation of information regarding types of products or services offered by an affiliate. This information may, for instance, comprise an indication of a type of product or service not provided by the referring entity that wishes to refer the client to the affiliate. This information may, however, comprise an indication of any type of product or service for which the referring entity wishes to refer the client to the affiliate, regardless of whether the referring entity itself offers that type of product or service. The referring entity and the affiliate may be entities that are associated or affiliated in any number of ways, such as by sharing common ownership, one having ownership of the other, or the like. The presentation of information regarding types of products or services offered by an affiliate may comprise the display of a webpage, email, or other type of message. The nature of the presentation of information may be similar to that shown in FIG. 3, illustrating a message from a brokerage to its clients about services of the brokerage's affiliated retail mortgage lender. As shown in the example provided in FIG. 3, the information presented in operation 802, may include a call-to-action inviting the client to "learn more" about the offerings of the affiliate.

The apparatus 200 may cause presentation of the information regarding types of products or services offered by the affiliate in a few different ways. In embodiments where a client interacts directly with the apparatus 200, input-output circuitry 208 of the apparatus 200 may present the information to the client and await a client response. In embodiments where the apparatus 200 interacts with a client through a separate client device, communications circuitry 206 of the apparatus 200 may cause the client device to present the information to the client and await a client response.

The apparatus 200 may further cause presentation of the information in a number of settings. As one example, the apparatus 200 may cause presentation of the information as part of a general advertisement shown on a website or mobile app associated with the referring entity. As another example, the apparatus 200 may cause presentation of the information as part of a directed advertising campaign to a specific and known client, and the information may be presented as an advertisement delivered through a website, a social media platform, or any other mobile app.

As shown by operation 804, the apparatus 200 may also include means, such as communications circuitry 206, input-output circuitry 208, or the like, for receiving an indicator of interest in the products or services of the affiliate. For instance, the client may click on a call-to-action presented in an advertisement, and the client's action may comprise the indicator of interest in the products or services of the affiliate. In embodiments where the client interacts directly with the apparatus 200, the apparatus 200 may receive the indicator of interest (e.g., the client's selection of the call-to-action) via input-output circuitry 208. In embodiments where the apparatus 200 interacts with a client through a separate client device, communications circuitry 206 of the apparatus 200 may receive the indicator of interest from the client device that presented the information to the client and that received the client's responsive selection of the call-to-action. In some embodiments, of course, the client may not provide an indicator of interest, or may proactively provide responsive action indicating a lack of interest in the products or services of the affiliate, and in either case the procedure may end. Assuming an indicator of interest is received, however, the procedure advances to operation 806.

As shown by operation 806, the apparatus 200 includes means, such as digitization circuitry 210, or the like, for automatically generating a digital ABAD for a client. In embodiments where the procedure includes operations 802 and 804, the apparatus 200 may automatically generate the digital ABAD in response to receiving the indicator of interest as set forth above in connection with operation 804. However, in embodiments not including operations 802 and 804, operation 806 may be initiated independently of any prior engagement with a client, such as where a FA may wish to refer a client to an affiliate and generate a digital ABAD as part of the referral process.

Regardless of what prompts generation of the digital ABAD, the component elements of the digital ABAD will be the same. Specifically, the digital ABAD may include text setting forth (i) a date of the digital ABAD, (ii) a name and an address of the client, (iii) a name of a referring party, (iv) a name of an affiliate, (v) a set of disclosures required by the Real Estate Settlement Procedures Act (RESPA), and (vi) an identifier uniquely identifying the digital ABAD. FIG. 5 illustrates the various elements of a digital ABAD at a high level.

Automatically generating the digital ABAD for the client may include retrieving these various elements. The digitization circuitry 210 may retrieve the client's name and address in one of a number of ways. For instance, in embodiments where the client has initiated an authenticated web session with the referring entity, the digitization circuitry 210 may be able to identify the client with a high degree of certainty, and may thus gather the name and address of the client from a record associated with the client that is held by the referring entity. The digitization circuitry 210 may alternatively gather the client's name and address in another way, such as by requesting that information from the client. Still further, if operation 806 was prompted by completion of operations 802 and 804, the indicator of interest received from the client in operation 804 may include the client's name and address.

In a similar fashion, the digitization circuitry 210 may retrieve the names of the referring and affiliate parties in a number of ways. Where operations 802 and 804 were performed, the referring entity and the affiliate will both generally be known because the identity of those parties is an element of the information that will be presented to the client during performance of operation 802. Moreover, the identity of the referring entity may simply be known in any case if the apparatus 200 is owned or operated by the referring entity. However, where operations 802 and 804 are not performed, and operation 806 is the first step in the procedure, the names of the referring entity and affiliate may be provided as part of initiation of operation 806 by a representative of the referring entity.

The digitization circuitry 210 may generate the unique identifier for the digital ABAD in any number of ways, and the unique identifier may take any number of forms provided that it can be used to uniquely identify the digital ABAD among all digital ABAD's referencing the particular client, referring entity, and/or affiliate.

Having retrieved the client's name and address, the identity of the referring entity and the affiliate, and the unique identifier, the digitization circuitry 210 may then generate a set of text comprising all of these components along with the set of affiliated business arrangement disclosures required by RESPA. This set of text comprises the digital ABAD that will be presented and/or delivered to the client in the manner set forth below in connection with operation 808.

As shown by operation 808, the apparatus 200 includes means, such as communications circuitry 206, input-output circuitry 208, or the like, for causing presentation of the digital ABAD. When the client is interacting with a separate client device, the communications circuitry 206 may, for instance, cause the separate client device associated with the client to present the digital ABAD to the client using a GUI. For instance, the communications circuitry 206 may instruct a web browser of the client device to display the digital ABAD to the user, either by directly embedding the digital ABAD into the webpage being displayed by the client device, by creating a new tab in the browser that contains the digital ABAD, by causing presentation of a pop-up browser window including the digital ABAD. As another example, the communication circuitry 206 may instruct the client device to open a mobile app associated with the referring party (or bring such an app to the foreground if it is already open on the client device), and natively present the digital ABAD to the client in the mobile app. When the apparatus 200 is engaging directly with a client, the input-output circuitry 208 may present the digital ABAD to the client in a similar fashion.

Prior to presenting the digital ABAD itself, the apparatus 200 may offer the client multiple options for how to view the digital ABAD, such as offering the ability to receive a copy of the digital ABAD as an email, to print a copy of the digital ABAD, to view the digital ABAD directly within a browser window, or the like.

In some embodiments, following presentation of the digital ABAD to the client, the apparatus may receive an indication that the digital ABAD was viewed. This indication may be received in a number of ways. If the digital ABAD is viewed using input-output circuitry 208 of the apparatus 200, specific input received via the input-output circuitry 208 may indicate whether (and, if so, when) the client has viewed the digital ABAD. For instance, if user input received via the input-output circuitry 208 indicates that a tab or window presenting the digital ABAD is brought to the foreground or otherwise selected by the client device, that action may be interpreted as evidence that the client has viewed the digital ABAD. Furthermore, if the client scrolls through the window providing set of text comprising the digital ABAD, that scrolling may be interpreted as indicating the portions of the digital ABAD that have been viewed by the client (and, when the window has been scrolled to its bottom position, may be interpreted as indicating that the entirety of the digital ABAD has been viewed by the client). Alternatively, the window, tab, or other GUI providing the digital ABAD to the client may also include interactive components, such as a check box or button that may be selected to confirm that the digital ABAD has been viewed.

However, even if the digital ABAD is viewed using a client device, similar indicators may be received by the apparatus 200 via the communications circuitry 206. For instance, the client device may capture user input of the nature described directly above and may relay that information to the communications circuitry 206 of the apparatus.

If the digital ABAD is viewed by the client using a mobile app associated with the referring party, the client's engagement with the mobile app can cause transmission of data to a server associated with the mobile app indicating the client's interaction with the mobile app, and that server may itself comprise the apparatus 200 or may be connected to the apparatus 200 such that the information may be relayed to the apparatus 200 via communications circuitry 206. The information gathered by the mobile app associated with the referring entity may in this way be relayed to the apparatus 200 as an indication regarding whether the digital ABAD was viewed.

It will be appreciated that although operation 808 describes causing presentation of the digital ABAD, operation 808 may in some embodiments cause delivery of the digital ABAD to the client via a separate channel that does not cause immediate presentation. For instance, the communications circuitry 206 may cause delivery to the client of an email containing the digital ABAD. The email may include the digital ABAD in the body of the message, may include the digital ABAD as an attachment, may include a link to a webpage hosting the digital ABAD, may include a link that, when selected on a mobile device, causes opening (or bringing to the foreground) of a mobile app associated with the referring party and presentation of the digital ABAD via that mobile app, or may otherwise deliver to the client information enabling the client to view the digital ABAD.

As shown by operation 810, the apparatus 200 includes means, such as communications circuitry 206 or the like, for causing referral of the client to an affiliate. It will be appreciated that causing referral of the client to an affiliate may occur in parallel with causing presentation or delivery of the digital ABAD. Alternatively, causing referral of the client to an affiliate may occur in response to causing presentation of the digital ABAD by the GUI of the client device. As yet another alternative, causing referral of the client to an affiliate may occur in response to receiving an indication that the digital ABAD was viewed using the client device (in embodiments where information regarding the client's interaction with the digital ABAD is received by the apparatus 200 as described above in connection with operation 808).

To effect the referral to the affiliate, the apparatus 200 may cause opening of a browser window or tab to a webpage associated with the affiliate referral. Where the client is interacting with the apparatus 200 directly, the input-output circuitry 208 of the apparatus 200 may present this information. However, where the client interacts with a separate client device, the communications circuitry 206 of the apparatus 200 may instruct that separate client device to navigate to the webpage associated with the affiliate referral. The webpage associated with the affiliate referral may be hosted by the referring entity or by the affiliate. In the former case, the webpage may enable the client to retrieve additional information about products or services offered by the affiliate and any promotions linked to the affiliate referral. Subsequently, the webpage associated with the affiliate referral may enable the client to directly engage with the affiliate, or in another way enable the affiliate to connect to the client for the purpose of the affiliated products or services identified by the referring party. In the latter case (where the webpage associated with the affiliate referral is hosted by the affiliate), the communications circuitry 206 may provide information regarding the client to the affiliate to enable the affiliate to personalize the webpage associated with the affiliate referral (or the communications circuitry 206 may have provided such information before effecting the referral). Alternatively, input-output circuitry 208 of the apparatus 200 open a mobile app associated with the affiliate and to natively present information regarding the affiliate referral using that mobile app (or, in the case of a client interacting with a separate client device, the communications circuitry 206 may cause the client device to open a mobile app associated with the affiliate and to natively present information regarding the affiliate referral using that mobile app).

As shown by operation 812, the apparatus 200 includes means, such as digitization circuitry 210 or the like, for generating a digital ABAD record. Generation of the digital ABAD record follows from the presentation of the digital ABAD, as described in connection with operation 808. To this end, the digital ABAD record may include a copy of the digital ABAD, or a link to a copy of the digital ABAD. Alternatively, the digital ABAD record may include information enabling a device to re-create a copy of the digital ABAD but might not actually store a copy of the digital ABAD record itself (this may be a useful protocol in embodiments where minimizing storage size of a digital ABAD record is of particular importance). The digital ABAD record may further include an indicator that the digital ABAD was presented to the client or an indicator that the digital ABAD was otherwise transmitted to the client (e.g., via email). Finally, the digital ABAD record may include a timestamp identifying a date and time of presentation of the digital ABAD by the GUI of the client device (or a timestamp identifying a date and time of delivery of the digital ABAD to the client). In embodiments where the apparatus 200 receives an indication that the digital ABAD was viewed, as described above in connection with operation 808, the digitization circuitry 210 may update the digital ABAD record to include a field indicating that the digital ABAD was viewed. This indicator may include a binary indicator or may include more granular indicia set indicating that the digital ABAD was viewed.

As shown by operation 814, the apparatus 200 includes means, such as memory 204, digitization circuitry 210, or the like, for storing the digital ABAD record. The digital ABAD record may be stored by the apparatus 200 in memory 204, or may be stored by a separate storage device (e.g., storage device 104, as shown in FIG. 1). In any event, storage of the digital ABAD record may be monitored closely to ensure compliance with all relevant regulatory requirements regarding duration of storage and the like.

Finally, as shown by operation 816, the apparatus 200 may include means, such as digitization circuitry 210 or the like, for retrieving the digital ABAD record in response to a regulatory inquiry. Using traditional means, it is difficult to provide evidence that an ABAD was provided to a client in a particular instance, because affiliated business arrangement disclosure statements are often delivered in paper form, and it is difficult to very when the delivery occurred, or that it occurred at all. However, by storing the digital ABAD record for a given affiliate referral, the corresponding digital ABAD record can be retrieved at any time with minimal difficulty and provided to a regulatory body, internal or external audit group, or the like. Historical processes for ABAD delivery rely on delivery of paper documentation, and as such do not enable entities to prove compliance with reporting obligations. In contrast, however, the ability to retrieve a digital ABAD record for every affiliate referral an entity makes enables complete verifiability of ABAD reporting obligations, whether in response to internal or external audit partner request, or requests from regulatory bodies.

As described above, example embodiments provide methods and apparatuses that enable improved enhancing regulatory compliance through digitization, using a technical and native-digital solution that replaces cumbersome manual processes for ABAD reporting obligations with an automated and robust digital experience that both enhances the ability to ensure regulatory compliance and unlocks new methods of interacting with existing clients. For instance, digitization of the ABAD delivery process relieves FAs of potential liability while minimizing the time required on ministerial matters. Furthermore, by utilizing digital solutions as set forth above, referring entities are able to make referrals to clients in near-real-time even where ABAD reporting obligations exist, a result that historically has not been possible in remote or digital engagement situations where delivery of an ABAD has been required. Finally, by storing records of the various digital ABADs associated with its various referrals, example embodiments permit the referring entity to audit its compliance with the ABAD requirements of RESPA, and to demonstrate its compliance to internal or external auditors or regulatory bodies in a way that has historically never been possible.

FIG. 8 illustrates a flowchart describing operations performed by apparatuses, methods, and computer program products according to various example embodiments. It will be understood that each block of the flowchart, and combinations of blocks in the flowchart, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for enhancing regulatory compliance through digitization, the method comprising:

automatically generating, by digitization circuitry via a processor, a digital affiliated business arrangement disclosure statement (ABAD) for a client;

causing, by communications circuitry via the processor, presentation of the digital ABAD via a graphical user interface (GUI) at a client device associated with the client;

in response to receiving an indication that the digital ABAD was viewed using the client device, digitally causing, by the communications circuitry via the processor, referral of the client to an affiliate in real-time, wherein the indication is received in response to the client having scrolled through an interactive window displaying the digital ABAD at the client device;

generating, by the digitization circuitry via the processor, a digital ABAD record in response to the presentation of the digital ABAD; and storing, by the digitization circuitry and via the processor, the digital ABAD record in memory.

2. The method of claim 1, wherein digitally causing the referral of the client to the affiliate comprises:

causing, by the communications circuitry via the processor, a browser of the client device to navigate to a webpage associated with the affiliate.

3. The method of claim 1, wherein digitally causing the referral of the client to the affiliate comprises:

causing, by the communications circuitry via the processor, the client device to open a mobile app associated with the affiliate.

4. The method of claim 1, further comprising:
receiving, by the communications circuitry via the processor and from the client device, an indicator of interest,
wherein the digital ABAD is automatically generated in response to receiving the indicator of interest.

5. The method of claim 1, wherein causing presentation of the digital ABAD comprises embedding the digital ABAD into a webpage being displayed by the client device.

6. The method of claim 1, further comprising:
updating, by the digitization circuitry via the processor, the digital ABAD record to include an indicator that the digital ABAD was viewed using the client device.

7. The method of claim 1, further comprising:
retrieving, by the digitization circuitry via the processor, the digital ABAD record in response to a regulatory inquiry.

8. An apparatus for enhancing regulatory compliance through digitization, the apparatus comprising:
a processor;
digitization circuitry configured to automatically generate, via the processor, a digital affiliated business arrangement disclosure statement (ABAD) for a client; and
communications circuitry configured to:
cause, via the processor, presentation of the digital ABAD via a graphical user interface (GUI) at a client device associated with the client, and
in response to receiving an indication that the digital ABAD was viewed using the client device, digitally cause, via the processor, referral of the client to an affiliate in real-time, wherein the indication is received in response to the client having scrolled through an interactive window displaying the digital ABAD at the client device;
wherein the digitization circuitry is further configured to:
generate, via the processor, a digital ABAD record in response to the presentation of the digital ABAD, and
store, via the processor, the digital ABAD record in memory.

9. The apparatus of claim 8, wherein the communications circuitry digitally causes the referral of the client to the affiliate by:
causing, via the processor, a browser of the client device to navigate to a webpage associated with the affiliate.

10. The apparatus of claim 8, wherein the communications circuitry digitally causes the referral of the client to the affiliate by:
causing, via the processor, the client device to open a mobile app associated with the affiliate.

11. The apparatus of claim 8,
wherein the communications circuitry is further configured to receive, via the processor and from the client device, an indicator of interest, and
wherein the digitization circuitry automatically generates the digital ABAD in response to receiving the indicator of interest.

12. The apparatus of claim 8, wherein causing presentation of the digital ABAD comprises embedding the digital ABAD into a webpage being displayed by the client device.

13. The apparatus of claim 8, wherein the digitization circuitry is further configured to update, via the processor, the digital ABAD record to include an indicator that the digital ABAD was viewed using the client device.

14. The apparatus of claim 8, wherein the digitization circuitry is further configured to retrieve, via the processor, the digital ABAD record in response to a regulatory inquiry.

15. A computer program product for enhancing regulatory compliance through digitization, the computer program product comprising at least one non-transitory computer-readable storage medium storing software instructions that, when executed, cause an apparatus to:
automatically generate a digital affiliated business arrangement disclosure statement (ABAD) for a client;
cause presentation of the digital ABAD via a graphical user interface (GUI) at a client device associated with the client;
in response to receiving an indication that the digital ABAD was viewed using the client device, digitally cause referral of the client to an affiliate in real-time, wherein the indication is received in response to the client having scrolled through an interactive window displaying the digital ABAD at the client device;
generate a digital ABAD record in response to the presentation of the digital ABAD; and
store the digital ABAD record in memory.

16. The computer program product of claim 15, wherein the software instructions that, when executed, cause the apparatus to digitally cause the referral of the client to the affiliate further cause the apparatus to:
cause a browser of the client device to navigate to a webpage associated with the affiliate.

17. The computer program product of claim 15, wherein the software instructions that, when executed, cause the apparatus to digitally cause the referral of the client to the affiliate further cause the apparatus to:
cause the client device to open a mobile app associated with the affiliate.

18. The computer program product of claim 15, further comprising software instructions that, when executed, cause the apparatus to:
receive, from the client device, an indicator of interest,
wherein the digital ABAD is automatically generated in response to receiving the indicator of interest.

19. The computer program product of claim 15, wherein the software instructions that, when executed, cause the apparatus to cause presentation of the digital ABAD further cause the apparatus to embed the digital ABAD into a webpage being displayed by the client device.

20. The computer program product of claim 15, further comprising software instructions that, when executed, cause the apparatus to:
update the digital ABAD record to include an indicator that the digital ABAD was viewed using the client device, and
retrieve the digital ABAD record in response to a regulatory inquiry.

* * * * *